United States Patent Office 3,435,164
Patented Mar. 25, 1969

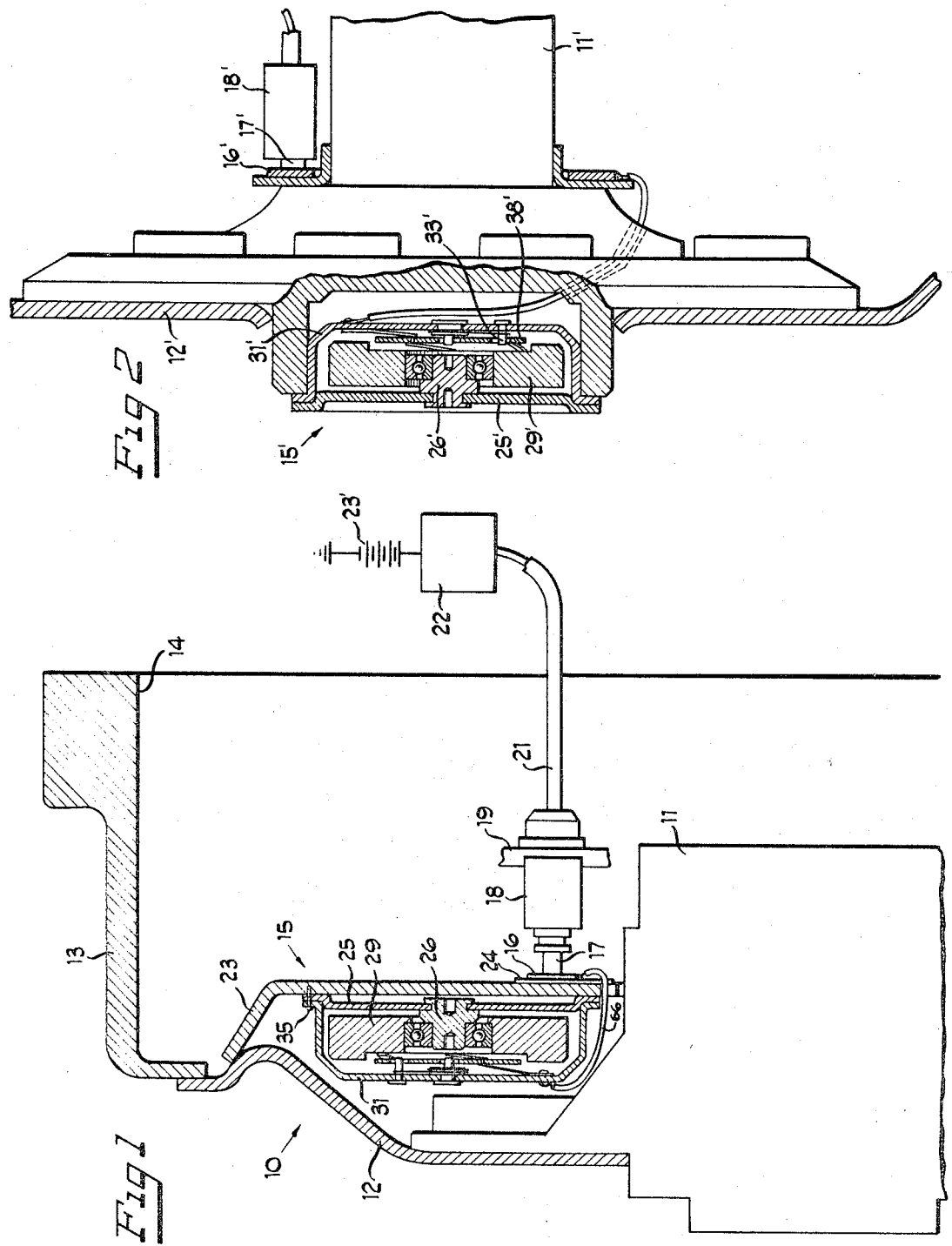

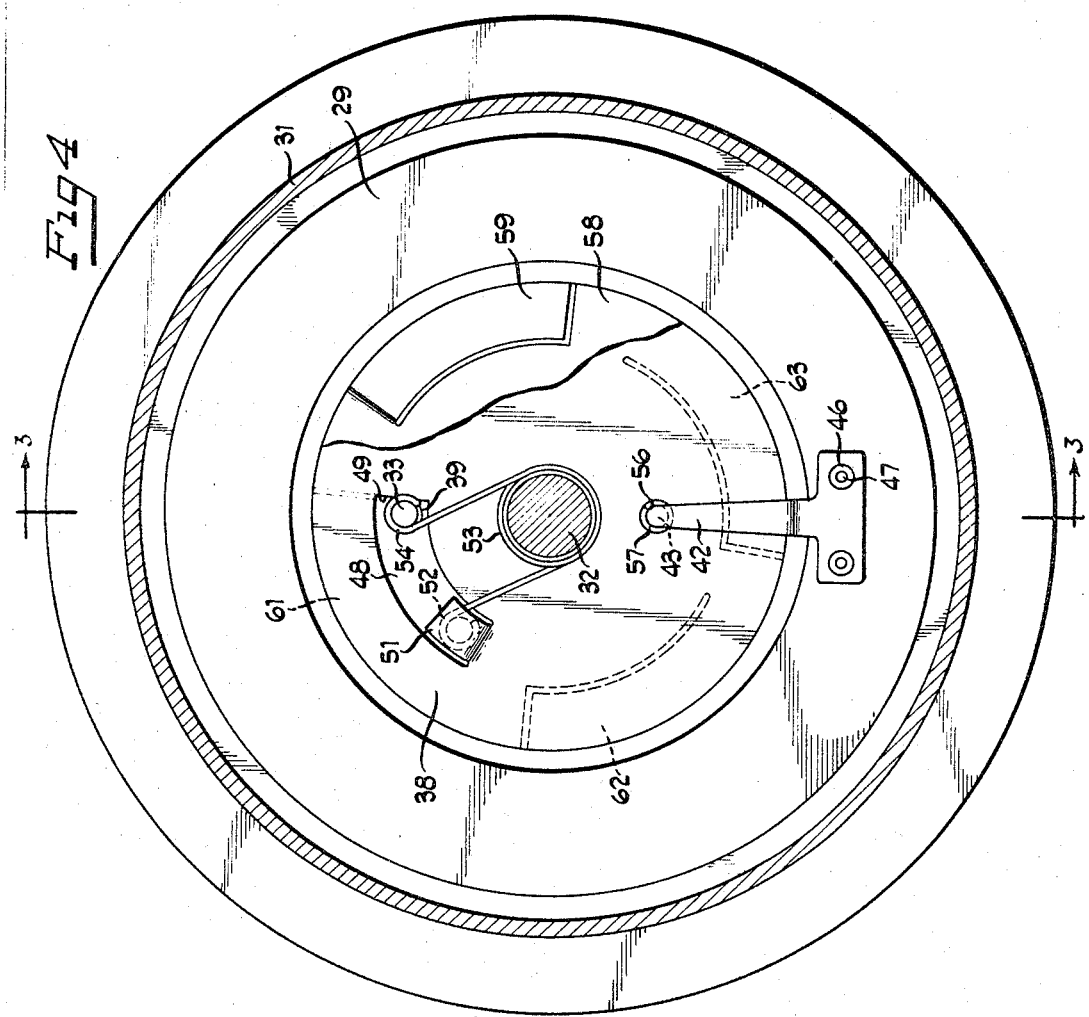
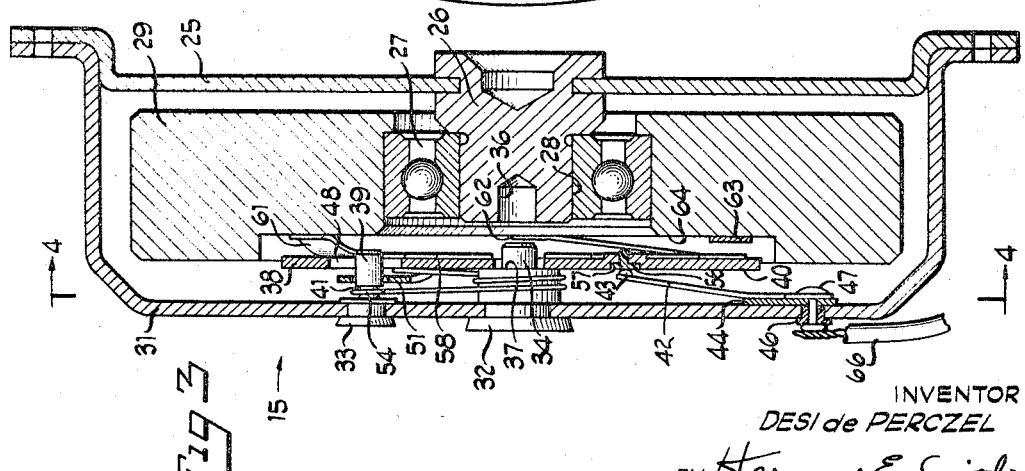

3,435,164
ANGULAR SPEED CHANGE SENSOR
Desi de Perczel, Brussels, Belgium, assignor to Borg-Warner Corporation, Chicago, Ill., a corporation of Illinois
Filed July 18, 1967, Ser. No. 654,137
Int. Cl. H01h 29/26
U.S. Cl. 200—61.46          11 Claims

ABSTRACT OF THE DISCLOSURE

An inertia apparatus for sensing changes in rotational speed of a rotary member, such as deceleration of a vehicle wheel, includes a housing which can be secured to the rotary member either coaxially or non-coaxially. Included within the housing is a flywheel, frictionally clutched to an actuator plate which is preloaded to a position of rest with respect to said housing. The flywheel thus remains at rest with respect to the housing and rotary member but rotates in space as the rotary member rotates. Thereafter, if the rotary member is decelerated, the inertia of the flywheel urges it to continue rotation. The flywheel is thus effective to rotate the actuating plate when the deceleration is great enough to overcome the preload on the actuating plate. Electrical contacts in the housing provide a signal indicating displacement of the actuating plate which can be conducted externally of the housing.

Summary of the invention

This invention relates to apparatus for sensing a rate of change in rotational velocity of a rotatable member and capable of providing a signal when the rate of change in angular velocity exceeds a preselected value.

The apparatus of the present invention is particularly useful in "anti-skid" safety devices for detecting deceleration of a vehicle wheel assembly. Studies have indicated that a locked wheel condition leading to an uncontrolled skid, can be detected in its incipiency by monitoring the rotational deceleration of the wheel assembly. When the deceleration of any particular wheel assembly exceeds the corresponding maximum deceleration of the entire vehicle, that particular wheel assembly will come to rest while the vehicle continues moving thus creating a locked wheel condition. When the wheel is locked, the coefficient of friction between the wheel and road surface is lowered thereby reducing its retarding effort. In the case of rubber tired vehicles, directional stability is also lost during a locked wheel condition since the wheel can skid sideways as well as forwardly.

Among the factor which influence the locked wheel condition are, the condition of the braking apparatus, the condition of each tire and the road surface with which it is in contact, and the wheel loading. Since these conditions may vary from wheel to wheel depending upon such factors as dynamic load transfer when slowing down or rounding a curve, patches of ice, snow or water on the pavement, and the adjustment of the braking apparatus, it is desirable to provide a sensing device for each wheel which can be incorporated in apparatus for modifying or regulating the braking effort of the respective wheel.

Heretofore sensors have been of such size that their use has been largely restricted to vehicles having large diameter wheels such as railroad cars, trucks, busses and aircraft. In addition, the sensor devices of the prior art usually include a rotatable shaft extending from the body of the unit which must be connected coaxially with the wheel assembly, further limiting the available location for mounting the sensing device in the wheel assembly.

It is therefore an object of the present invention to provide a small compact deceleration sensing device having the capability of a wide latitude of mounting locations which may be incorporated in a wheel assembly already crowded with braking apparatus.

A further object is to provide a deceleration sensing device which may be mounted either on or off the axis of rotation of the wheel assembly for rotation or orbital movement as the wheel assembly rotates.

A further object of the invention is to provide a deceleration sensing device which is unusually sensitive to changes in the rotary velocity of a wheel assembly.

A still further object is to provide a deceleration sensing device in which the movable parts may, if desired, be totally enclosed within a housing having only an electrical conductor extending externally thereof.

These and other objects, advantages, and uses of the present invention will become more apparent from a reading of the following specification together with the drawings.

Brief description of the drawings

FIGURE 1 is a section view of a speed-change sensor according to the present invention, shown in the environment of an automobile vehicle wheel assembly mounted for orbital movement about the axis of rotation thereof;

FIGURE 2 is a view similar to FIGURE 1 showing the speed change sensor of FIGURE 1 incorporated in the hub portion of a wheel assembly, mounted coaxially therewith;

FIGURE 3 is an enlarged fragmentary section view of the speed-change sensor of FIGURE 1, the figure being taken generally along the line 3—3 of FIGURE 4; and FIGURE 4 is a fragmentary view taken along the line 4—4 of FIGURE 3.

Description of the preferred embodiments

Turning now to the drawings and more particularly to FIGURE 1 thereof, there is shown a portion of an automotive vehicle wheel assembly indicated generally by the reference character 10, including a hub portion 11 and a disk portion 12 extending therearound. A rim portion 13 is connected to the perimeter of disk portion 12 and includes a brake drum surface 14 for engagement with brake shoes not shown in the drawing. The wheel hub, disk, and rim thus far described, are conventional components of an automotive vehicle wheel assembly and are shown as providing an environment for the speed-change sensing apparatus subassembly indicated by the reference character 15. The speed change sensing apparatus 15 is electrically connected to a slip ring 16 in contact with brush 17. Brushholder 18 is nonrotatably mounted on frame member 19 which may be the back plate of a brake assembly or a stationary axle member, and supports brush 17 for establishing an electrical circuit from slip ring 16, through conductor cable 21, to brake regulation apparatus 22, which is connected to a battery 23'. The brake regulation apparatus 22 is indicated schematically inasmuch as regulation may be accomplished in various ways by means of various apparatus, the device of the present invention being effective to provide an electrical signal which may be employed to operate a suitable solenoid or relay in the more comprehensive brake regulation apparatus, for example a hydraulic valve in the brake circuit of the wheel brake associated with the sensor.

An alternate mounting for the speed change sensor is shown in FIGURE 2 in which corresponding elements are indicated by reference characters with primes affixed.

Turning now to a more detailed description of the speed change sensor device 15, reference should be made to FIGURES 1 and 3 for a fuller understanding of the various elements thereof and their cooperation with each other.

A mounting member 23, of annular configuration, is secured to disk portion 12 of wheel assembly 10. The connection may be made by welding, riveting, or bolting, bolting being preferred. A ring of insulating material 24 is secured to one face of mounting member 23 as by adhesives and serves as a mounting for slip ring 16. The mounting member 23 may serve as a wall of the housing for the sensor device 15 if desired, however, as shown in the drawing, the additional wall member 25 is provided. In some circumstances it may be more desirable to provide the sensor 15 entirely enclosed within a housing formed by wall member 25 and cover member 31. The unitary assembly can then be secured to mounting member 23 or to other portions of the rotatable wheel assembly as by cap screws 35, or by other well known means such as welding. In other circumstances it may be more desirable to employ the mounting member 23 as a wall of the housing to provide greater strength and rigidity in the mounting.

A stud 26 is riveted in place on mounting member 23 or wall member 25, serving to support a ball bearing assembly 27 mounted on cylindrical portion 28 thereof. Ball bearing assembly 27, in turn, serves to rotatably support flywheel-like inertia member 29.

Cover member 31 is provided with a pair of inwardly projecting studs 32 and 33, the stud 32 including a cylindrical projection 34 extending toward a counterbore 36 in stud 26. Where stud 26 and flywheel 29 are mounted directly on mounting member 23, projection 34 can be extended into counterbore 36, if desired, for aligning cover plate 31 with the other components of the assembly. Another advantage of extending projection 34 into counterbore 36 is that stud 32 and cover member 31 are thereby provided with an additional electrical ground to wall member 25 and mounting member 23. Cover member 31 is secured to mounting member 23 by cap screws 35 which extend through wall member 25. Projection 34 defines a shoulder 37 on stud 32 serving as an abutment for locating actuator plate 38. The other cover member stud 33 includes a groove 41 adjacent a cylindrical enlargement 39 which serves as a stop member for actuator plate 38.

Cover member 31 has mounted thereon a portion of a make and break electrical switch including the resilient electrically conductive finger 42 having the wiping contact 43 on one extremity thereof. The other end portion of finger 42 is secured to the inside of cover member 31 by insulating grommet 46 and conductive rivet 47 and is insulated therefrom by a sheet of insulating material 44. The rivet 47 extends through and beyond the grommet forming a binding post exteriorly of the cover plate.

Actuator plate or disk 38 includes an arcuate aperture 48 surrounding the enlargement 39 of stud 33. One end surface 49 of aperture 48 is arranged to normally engage cylindrical stop surface 39 for circumferential location of actuator plate 38. The other end portion 51 of aperture 48 is lanced and offset from the plane of the plate to form a pocket for receiving one end 52 of torsion spring 53. The other end 54 of torsion spring 53 grips the recess 41 of stud 33 locating and securing the spring 53 in axial assembly. The midportion of spring 53 is looped about stud 32, further orienting the spring in the assembly. The aperture end portions 49, 51, stop member 39 and spring 53 thus provide a resilient lost motion connection between the actuator plate and housing permitting a limited amount of angular motion of the actuator plate with respect to the housing.

Actuator plate 38 is preferably formed of an electrically conductive material such as copper and is provided with a recess 56 into which a button 57 of plastic insulating material is inserted so that it is flush with one face 40 of plate 38. As shown in FIGURE 3, plate 38 is semi-punched to produce the recess 56 in one face 40 and a corresponding boss on the opposite face, the boss being pierced to provide an aperture through the plate. The plastic insulating material is pressed into recess 56 and extruded through the aperture to form a tight bond with the plate 38 providing a smooth surface on the one face 40 thereof.

The end surface 49 of aperture 48, the recess 56, finger 42, and stud 33 are so arranged that wiping contact 43 bears against nonconductive button 57 when plate 38 is oriented in its position of rest against stop 39. When plate 38 is moved arcuately with respect to stop 39, wiping contact 43 no longer engages the nonconductive zone defined by insulating button 57 and begins to bear against the conductive zone defined by the one face 40 of plate 38. The wiping contact 43 and plate 38 are thus effective to provide a make and break electrical switch depending upon the angular disposition of plate 38 with respect to stop 39. It should be noted that wiping contact 43 bears against plate 38 with constant pressure in all angular positions of the plate whether in make or break position. Wiping contact 43 and finger 42 are thus enabled to become fully conductive upon a given angular movement of plate 38, avoiding the rebounding of contacts and the problem of a high resistance transition zone such as would be encountered by contacts which are spaced apart and brought to bear more firmly upon each other.

An insulated electrical conductor 66 is connected between rivet 47 and slip ring 16 providing a portion of an electrically conductive path from wiping contact 43 through the brush 17 and cable 21 to the brake regulation apparatus 22. Actuator plate 38 is grounded to the vehicle frame through the housing, mounting member, wheel assembly, and suspension system. A battery 23' is grounded to the vehicle frame and connected to the brake regulation apparatus 22 thus completing an electrical circuit which is open when wiping contact 43 engages insulating button 56 and closed when wiping contact 43 engages the one face of actuating plate 38. When the circuit is open, no current flows through the regulating apparatus 22 and it, therefore, remains inactive. When the circuit is closed, the flow of current energizes brake regulating apparatus 22 to modify the braking effect.

A thin disk 58 of spring material such as stainless steel bears against the other face of actuating plate 38 and includes three apertures, one being slightly larger overall than aperture 48 in actuator plate 38 and another being slightly larger than projection 34 of stud 32. The third aperture receives the semi-punched boss portion associated with recess 56, rotatively fixing disk 58 to actuator plate 38.

Disk 58 is lanced to provide leaf spring portions 59, 61, 62, 63 extending outwardly therefrom into frictional engagement with a recessed face 64 of inertia member 29, and serve to frictionally couple or clutch actuating plate 38 to the flywheel 29. The reaction of the force of fingers 59, 61, 62 and 63 is taken by plate 38 in contact with shoulder 37 of stud 32. The friction developed between plate 38 and shoulder 37 serves to dampen angular movement of plate 38, and if too great, could possibly reduce the sensitivity of the unit. This frictional dampening force can be regulated by including a plastic washer between plate 38 and shoulder 37 if desired.

In operation, mounting member 23 is caused to rotate with the wheel assembly carrying with it the deceleration or speed change sensing device 15 which travels in an orbit about the axis of rotation of wheel assembly 10. Flywheel inertia member 29, being frictionally clutched to the rotating assembly, is thereby restrained from rotating freely about the stud 26 and is caused to undergo a rotation in space for each orbital rotation about the wheel assembly axis. Although inertia member 29 does not rotate about its axis, it acquires potential energy of rotation as the wheel assembly rotates. Since there is ordinarily no relative rotation of the inertia member about the stud, the bearing 27 is relieved of wear. When the wheel assembly is decelerated at a rate corresponding to the calibration of spring 53, the flywheel 29 tends to continue its rotation in space causing it to rotate about stud 26. The flywheel 29 being frictionally coupled to the actuator plate causes it to rotate compressing spring 53, whereupon the surface 49 of plate 38 is rotated away from stop 39, and insulated button 57 is moved from under contact 43. Once the deceleration value determined by spring 53 is exceeded, wiping contact 43 contacts the conductive zone of plate 38 closing the circuit with the solenoid operated hydraulic valve which relieves pressure in the hydraulic circuit leading to the brake assembly of the vehicle wheel with which the sensor is associated. Relieving the pressure stops the braking action and allows the wheel to accelerate to road speed during which action it catches up to the overrunning speed of the flywheel subsequently allowing spring 53 to rotate plate 38 and surface 49 back to the rest position against stop 39. This breaks the circuit and actuates the solenoid valve to restore pressure thus again braking the wheel. This action repeats itself many times per second so that the wheel controlled by that sensor is repeatedly snubbed to avoid a continuous skid.

The angular speed change sensor indicated as 15' in FIGURE 2 operates in a similar fashion although it is mounted on the axis of rotation of the wheel assembly. The housing members 25' and 31' both rotate with the wheel assembly. The member 25' driving the stud 26', and the member 31' driving the inertia member 29' through the stud 33' and actuating plate 38'. The inertia member 29' is thus caused to undergo rotation in space without spinning on the stud 26' thereby storing potential energy of rotation. When the wheel assembly is decelerated beyond the desired limit, this potential energy is transmitted to actuating plate 38' causing it to undergo angular movement against the bias of its preload spring.

While a preferred form of the invention has been shown and described, it is to be understood that other modifications and variations thereof are included within the spirit of the invention and scope of the following claims.

What is claimed is:

1. In a device for sensing the rate of change in rotational velocity of a rotatable member, the improvement comprising:
    a housing (31, 25, or 23) adapted to be secured to said rotatable member (10), said housing defining an enclosed chamber;
    a flywheel (29) disposed within said chamber and rotatably supported on a portion of said housing;
    drive means coupling said flywheel to said housing including an actuator plate (38) frictionally clutched to said flywheel and a drive coupling (39) connecting said actuator plate to said housing, said actuator plate and drive coupling normally restraining said flywheel against rotation with respect to said housing but permitting said flywheel to overrun said housing responsive to a preselected rate of change in the rotational velocity of said rotatable member; and
    indicating means (42, 43, 47) disposed within said chamber effective to provide a signal responsive to said flywheel overrunning said housing and to conduct said signal externally of said chamber.

2. The invention according to claim 1 in which said actuator plate is mounted within said chamber for limited rotation with respect to said housing said actuator plate including electrically conductive means (40) cooperating with said indicating means (43) to provide an electrical signal when said actuator plate is moved relative to said housing responsive to said flywheel overrunning said housing.

3. The invention according to claim 1 in which the portion (23, 25) of said housing supporting said flywheel is spaced from the center of rotation of said rotatable member.

4. The invention according to claim 1 in which a portion of said housing is provided by an annular plate member (23) adapted to be secured coaxially with a rotatable wheel assembly (10), said flywheel (29) being mounted on said annular plate member spaced from the center of rotation thereof.

5. The invention according to claim 1 in which said drive coupling includes a projection (39) extending from said housing into said chamber drivably engaged with a portion (49) of said actuator plate (38), and a preload spring (53) connected said housing and said actuator plate biasing said actuator plate portion against said projection, said spring yieldably permitting limited angular movement of said plate with respect to said housing as said flywheel overruns said housing responsive to a preselected rate of change in the rotational velocity of said rotatable member.

6. The invention according to claim 1 in which said actuator plate (38) includes an electrically conductive face portion (40) grounded to said housing defining an electrically conductive zone thereof, said actuator plate including an interruption (56) in said conductive face portion defining a nonconductive zone thereof, said nonconductive zone being operatively associated with said indicating means (43) when said flywheel is at rest with respect to said housing and said conductive zone continuously engaging said indicating means while said flywheel is overrunning said housing.

7. The invention according to claim 6 in which said nonconductive zone is further defined by an insulating button (57) recessed within said face.

8. The invention according to claim 1 in which said housing includes a pair of spaced wall members (23, or 25, 31) facing each other defining a portion of said chamber, one of said wall members (31) including a pair of spaced studs (32, 33) projecting inwardly into said chamber and the other of said walls (23, 25) including a third stud (26) projecting inwardly into said chamber, said third stud providing means for rotatably supporting said flywheel (29) within said chamber, said pair of studs on said one wall member providing mounting means and a drive coupling for an actuator plate (38), said actuator plate being frictionally engaged with said flywheel providing drive means for driving said flywheel from said housing.

9. Apparatus (15) for detecting changes in the rotational velocity of a rotatable member (10) comprising:
    a housing (31, 25 or 23) adapted to be secured to a portion of said rotatable member;
    an inertia member (29) supported on said housing for rotation in a plane parallel to the plane of rotation of said rotatable member;
    an actuator plate (38) supported on said housing for limited angular movement with respect thereto having electrical conductive (40) and nonconductive (57) zones disposed adjacent each other along a portion thereof, said actuator plate and inertia member being frictionally coupled to each other for movement together within the range of limited angular movement of said actuator plate, said actuator plate and inertia member slipping with respect to each other to permit rotation of said inertia member beyond the range of angular movement of said actuator plate;
    means defining a lost motion connection (49, 39), including a preload spring (53), coupling said actuator plate to said housing, said lost motion connection means biasing said plate to a position of rest with respect to said housing and yieldably permitting limited angular movement of said plate with respect to said housing responsive to a preselected rate of change in the rotational velocity of said rotatable member; and
    electrical contact means (42, 43) mounted on said housing and bearing against the portion of said actuator plate including said adjacent electrically conductive (40) and nonconductive zones (57), said contact means being disposed for engagement with one of said zones when said plate is at rest with respect to said housing and for engagement with the other of said zones when said plate is angularly displaced from its position of rest with respect to said housing.

10. The invention according to claim 9 in which said actuator plate (38) includes an electrically conductive face portion (40) grounded to said housing (31) defining the electrically conductive zone thereof, said plate also, including an electrically insulating button (57) defining the nonconductive zone thereof disposed on said face in engagement with said electrical contact means (43) when said plate is at rest with respect to said housing, said contact means and plate providing an open electrical circuit only when said plate is at rest with respect to said housing and providing a closed electrical circuit continuously while said plate is displaced from its position of rest with respect to said housing.

11. The invention according to claim 9 in which said housing includes a pair of spaced wall members (31, 25, or 23) facing each other defining a portion of an enclosure, one of said wall members (31) including a stud (32) and a stop member (39) projecting inwardly of said enclosure;

said actuator plate (38) being mounted for turning movement about said stud and including an aperture embracing said stop member (39) for limiting the anagular movement of said plate with respect to said housing, one end (49) of said aperture being biased into engagement with said stop member (39) by means of a torsion spring (53) defining a position of rest of said plate with respect to said housing, said stop member (39), said torsion spring (53) and the end portions (49, 51 of said aperture defining said lost motion connection, one face (40) of said plate being electrically conductive and including an insulating button (57) defining said adjacent conductive and nonconductive zones; and said electrical contact means including a wiping contact (43) mounted on said wall member (31) and insulated (44) therefrom disposed so as to bear against said insulating button (57) when said plate is in its said position of rest with respect to said housing.

References Cited

UNITED STATES PATENTS

| 1,311,135 | 7/1919 | Olds | 200—61.46 |
| 2,317,146 | 4/1943 | Hines | 200—61.46 |
| 3,141,935 | 7/1964 | Brueder | 200—61.46 |
| 3,352,388 | 11/1967 | Leiber | 200—61.46 X |

ROBERT K. SCHAEFER, *Primary Examiner.*

R. A. VANDERHYE, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,435,164                                                            March 25, 1969

Desi de Perczel

It is certified that error appears in the above identified patent and that said Letters Patent are hereby corrected as shown below:

Column 6, line 11, after "connected" insert -- between --. Column 7, line 2, "saaid" should read -- said --. Column 8, line 1, "anagular" should read -- angular --; line 7, "51" should read -- 51) --.

Signed and sealed this 31st day of March 1970.

(SEAL)
Attest:

Edward M. Fletcher, Jr.                                    WILLIAM E. SCHUYLER, JR Attesting Officer                                                Commissioner of Patents